Sept. 15, 1925.
H. HOLLDACK
CULTIVATOR
Filed May 2, 1922     2 Sheets-Sheet 1
1,553,777
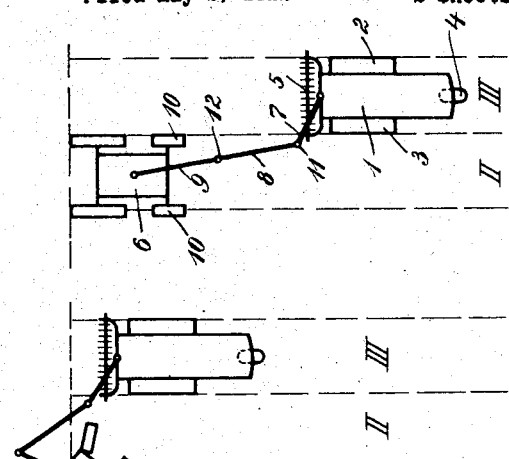
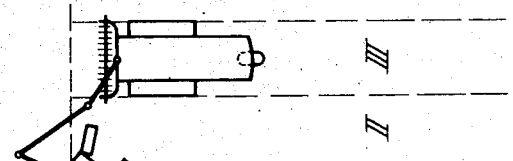
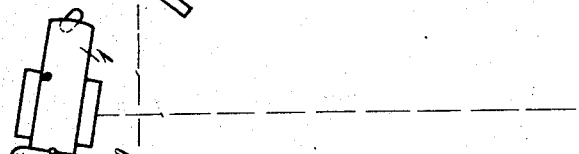
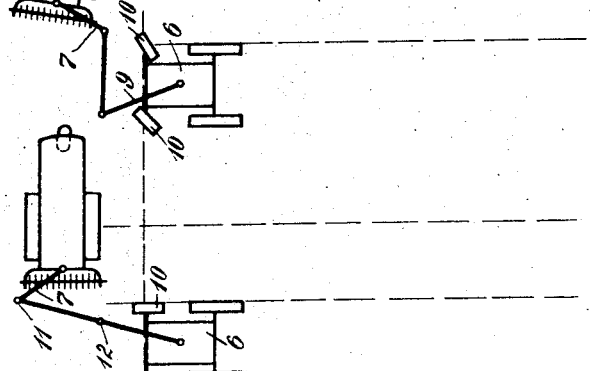
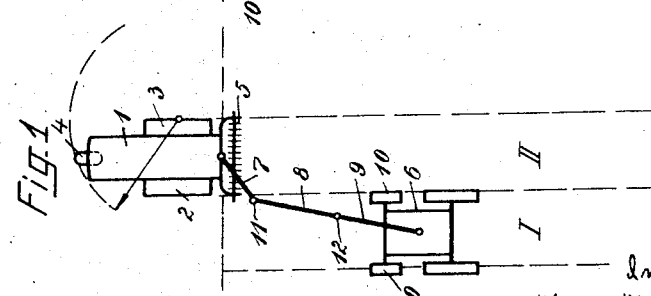
Inventor
Hans Holldack
by Knight Bros
attorneys Sept. 15, 1925.　　　　　　　　　　　　　　　　1,553,777
H. HOLLDACK
CULTIVATOR
Filed May 2, 1922　　　　2 Sheets-Sheet 2
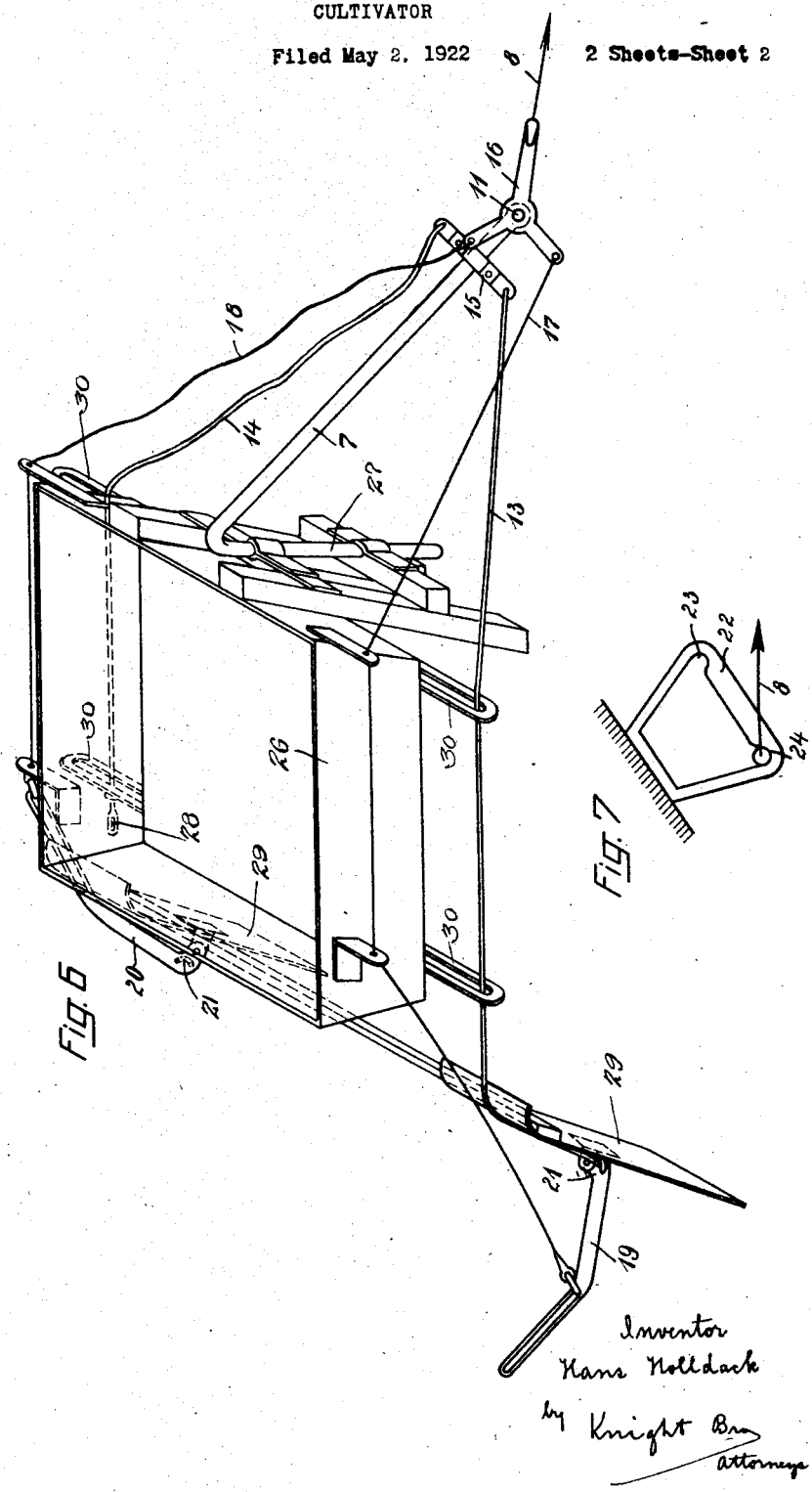

Patented Sept. 15, 1925.

1,553,777

UNITED STATES PATENT OFFICE.

HANS HOLLDACK, OF GIESHOF, NEAR NEUBARNIM, GERMANY.

CULTIVATOR.

Application filed May 2, 1922. Serial No. 557,932.

*To all whom it may concern:*

Be it known that I, HANS HOLLDACK, a citizen of the German Empire, residing at Gieshof, near Neubarnim, Germany, have invented certain new and useful Improvements in Cultivators, of which the following is a specification.

This invention relates to improvements in cultivators comprising a tractor and a trailer, the tractor being fitted with motor-driven cultivating tools, for instance cutters, while the trailer is to run with its middle axis laterally to the middle axis of the tractor a distance of about the width of a strip of land to be cultivated.

The trailer may, for instance, consist of a harrow, roller, drilling machine, manure spreading machine, or the like.

The arrangement has the advantage that the trailer with its attendants thereon is displaced beyond the projecting direction of the cultivating tools on the tractor, which, particularly when of revolving type, frequently project stones onto the trailer behind, so that the attendants thereon are struck and hurt.

Furthermore, the trailer can be steered independently from the tractor, which is of importance particularly when drilling and for cultures in rows. If the trailer would run in the same axial direction as the tractor, it would generally participate in all non-uniform movements of the latter, even if it is steered separately, as the attendants on the trailer are prevented by the tractor in front thereof from keeping the proper direction.

Besides, the arrangement has the advantage that the working widths of the two machines are rather independent from one another, so that the trailer can always work a full working width.

Finally, the arrangement allows to turn the machines in a most favourable way.

The accompanying drawings represent in Figs. 1 to 5 inclusive diagrammatical plan views of the machines in different positions of the same, while Fig. 6 shows in perspective view certain constructional details for automatically changing the position of the fulcrum between the traction links; and Fig. 7 shows a modification thereof.

Referring to Figures 1 to 5, 1 is the tractor with the two lateral wheels 2 and 3 and the front guide-wheel 4. On the rear end of the tractor, the motor-driven cultivating tools 5, for instance cutters, are mounted, 6 is the trailer which is carried along by the tractor 1 by means of pivotal links 7, 8, 9.

In the position shown in Fig. 1, the tractor has arrived at the end of the land to be cultivated, having cultivated the strip II by means of the cutters 5. The trailer 6, for example a drilling machine, has drilled the strip I that was previously cultivated by the tractor at the preceding trip. It then becomes of importance to turn the tractor in such a way that this requires as little room as possible and at the same time to pull the trailer on the strip I up to the end of the latter and then to turn it in such a way that during the return way of both machines it works the next strip II.

For this purpose, the wheel 3 of the tractor is locked or braked and the wheel 2 only is driven. The tractor describes then a circle indicated in Fig. 1. The consequence of this movement is that the trailer is pulled up to the end of the land, this being attained by the link 7 on the tractor 1 which is turned aside and locked in this position. The tractor has then assumed the position shown in Fig. 2.

In this position, the link 7 is thrown to the opposite side, as is also the link 9 on the trailer 6 (see Fig. 3). At the same time, the front steering wheels 10 of the trailer are turned aside by the attendant riding on the trailer and the tractor 1 turns further until it has arrived at the next strip III to be cultivated, as shown in Fig. 4. After it has advanced a certain distance on strip III, also the trailer 6 has accomplished a full turn (see Fig. 5). Thereupon, the strip III is cultivated by the cutters 5 and the strip II, that was cultivated by the tractor during the preceding trip, is worked by the trailer 6 which may for instance carry a drilling machine.

As shown in the illustrations, it is essential that the fulcra 11 and 12 of the links lie laterally and on opposite sides of the central longitudinal axes of the tractor and trailer respectively and that this position of the fulcra, when turning the vehicles, is reversed so that they are displaced at each vehicle from one to the other side of the respective middle axis of the vehicles.

For the purpose of obviating an overlooking of such displacement of the fulcra 11 and 12 by the attendant, whereby the trailer might possibly be pulled too near to the tractor and collide with it, provision is made that such displacement, particularly of the fulcrum 11 of the tractor link 7, is effected automatically, for instance in dependency upon the mutual angular relation between the two machines or on the distance between the same.

Such an arrangement is represented in Fig. 6. For this purpose a frame 26 is provided and mounted on the rear end of the tractor, to which link 7 is pivotally attached as shown at 27. Link 7 is held in its extreme angular positions relatively to the tractor (for instance as shown in Fig. 1) by means of two ropes 13 and 14 respectively, which are guided in elongated eyes 30 as shown. Each rope is provided at its free end with a loop 28 which may be fastened to a hook 21, one being provided for each rope 13 and 14 on a lever 19 and 20 respectively, so that when the lever is pulled down (19 Fig. 6), the loop hangs in the hook, and when the lever is raised (20 Fig. 6), the loop can slip off the hook and is freed (28 Fig. 6). Levers 19 and 20 may be suitably attached to plates 29 fastened to the frame or to the tractor directly. Owing to the link 7 being under considerable tension caused by the trailer 6, a considerable expenditure of force is required for holding the link 7 in its end positions, so that it would be difficult to free the link 7 by directly overcoming this tension.

According to the invention, therefore, ropes 13 and 14 may be disengaged from their respective hooks by means of separate steering-ropes, which are automatically operated when the normal angular relation between links 7 and 8 changes, such as will occur in making turns.

On both sides of the link 7, the ends of the two pull-ropes 13 and 14 are attached to a cross-member 15 fixed to the link. The free end of the link 7 carries a pivotal three-arm lever 16, two arms of which are connected to the ends of two steering-ropes 17 and 18 respectively while the third arm is connected to the draw bar 8 indicated in Fig. 6 by an arrow. The other ends of the pull-ropes 13 and 14 are, as mentioned before disengageably connected to levers 19 and 20, to which also the other ends of the steering-ropes 17 and 18 are attached. When the three-arm lever 16 assumes, in turning the machines, a position shown in Fig. 6, a pull is exerted on the steering-rope 17 and thereby the lever 19 is thrown up. The pull-rope 13 can slip from its hook 21 and the link 7 is liberated. The latter can thus turn to the opposite side and be locked in this position by hooking pull-rope 14 to its hook 21 on lever 20.

At the same time, the link 9 on the trailer is turned over by the attendant by hand and fastened in the position shown in Fig. 3, by any ordinary suitable means not shown.

Instead of displacing the fulcrum 11 by turning a link 7 on the tractor, said fulcrum can also be moved along a yoke 22 mounted on the tractor and provided with notches 23 and 24, in which the fulcrum 11 of draw bar 8 engages in its end positions, such as for instance shown in Fig. 7.

For spreading manure, for instance, it may be preferable to run the manure spreading machine on the strip of uncultivated land ahead of that being at the time cultivated by the tractor, and then to work the strip of land, on which manure has thus been spread, subsequently by the cultivating tools of the tractor. In other words, in this case the trailer runs, as it were, " ahead " of the tractor so far as its working operation is concerned. In this case, the coupling links between tractor and trailer are so adjusted to each other that also a turning of the machines without a too large expenditure of power is possible.

The arrangement is also applicable to stubble sowing, the seed being in this case sown on the uncultivated land and immerged during the succeeding cultivation of the land.

What I claim, is:—

1. In a cultivator in combination a tractor carrying motor driven cultivating tools with a trailer, a draw bar for coupling said vehicles to each other, the coupling points of said bar being located laterally of the central longitudinal axes of said vehicles and means for maintaining said points in this position to cause the trailer to run laterally of the longitudinal tractor axis a distance of about the width of the strip of land being cultivated, and means responsive to the angular position of the draw bar to said tractor axis, for automatically releasing said maintaining means to permit the displacement of said coupling points from one side of the respective vehicle axis to the other when the vehicles are turned.

2. In a cultivator in combination a tractor carrying motor driven cultivating tools with a trailer, a draw bar pivotally attached to either vehicle for coupling said two vehicles, a link pivotally attached to the tractor and carrying at its outer end the pivotal connection with said draw bar, means for holding said link at an angle to the central longitudinal axis of the tractor to shift the bar pivotal point at the tractor laterally of the tractor axis to maintain both pivotal points of the bar laterally of the central longitudinal axes of both vehicles to cause the trailer to run laterally of the tractor a distance of about the width of the strip of land being cultivated.

3. In a cultivator in combination a tractor carrying motor driven cultivating tools with a trailer, a draw bar pivotally attached to either vehicle for coupling said two vehicles, a link pivotally attached to the tractor and carrying at its outer end the pivotal connection with said draw bar, means for holding said link at an angle to the central longitudinal axis of the tractor to shift the bar pivotal point at the tractor laterally of the tractor axis to maintain both pivotal points of the bar laterally of the central longitudinal axes of both vehicles to cause the trailer to run laterally of the tractor a distance of about the width of the strip of land being cultivated, and means connected to said draw bar and responsive to the change in angular relation between said link and said draw bar for releasing said link holding means when said angular relation varies from normal, during the turning of the vehicles, to permit the displacement of said bar pivots from one side of the longitudinal axes of the vehicles respectively to the other side.

4. In a cultivator in combination a tractor carrying motor driven cultivating tools with a trailer, a draw bar pivotally attached to either vehicle for coupling said two vehicles, a link pivotally attached to the tractor and carrying at its outer end the pivotal connection with said draw bar, means for holding said link at an angle to the central longitudinal axis of the tractor to shift the bar pivotal point at the tractor laterally of the tractor axis to maintain both pivotal points of the bar laterally of the central longitudinal axes of both vehicles to cause the trailer to run laterally of the tractor a distance of about the width of the strip of land being cultivated, and a two-armed lever connected to said draw bar and adapted to change its angular relation to said link with the angular change of the bar thereto, means connected to said lever for releasing said link holding means when said angular relation varies from normal, during the turning of the vehicles, to permit the displacement of said bar pivots from one side of the longitudinal axes of the vehicles respectively to the other side.

5. In a cultivator in combination a tractor carrying motor driven cultivating tools with a trailer, a draw bar pivotally attached to either vehicle for coupling said two vehicles, a link pivotally attached to the tractor and carrying at its outer end the pivotal connection with said draw bar, a holding rope for holding said link at an angle to the central longitudinal axis of the tractor to shift the bar pivotal point at the tractor laterally of said axis to maintain both pivotal points of the bar laterally of the central longitudinal axes of both vehicles to cause the trailer to run laterally of the tractor a distance of about the width of the strip of land being cultivated, and a two-armed lever connected to said draw bar and adapted to change its angular relation to said link with the angular change of the bar thereto when the vehicles are turned, a holding rope connected to said lever and to said holding rope and adapted to release said holding rope when said angular relation varies from normal to permit the displacement of said bar pivots from one side of the longitudinal axes of the vehicles respectively to the other side.

In testimony whereof I affix my signature.

HANS HOLLDACK.